United States Patent
Pereira Lima et al.

(10) Patent No.: US 11,453,014 B2
(45) Date of Patent: Sep. 27, 2022

(54) CONCENTRATION PROCESS OF IRON ORE SLIMES

(71) Applicant: Vale S.A., Rio de Janeiro (BR)

(72) Inventors: Neymayer Pereira Lima, Belo Horizonte (BR); Klaydison Carlaile Silva, Belo Horizonte (BR); Maurício Curi Segato, Ouro Preto (BR)

(73) Assignee: VALE S.A., Rio de Janeiro (BR)

( * ) Notice: Subject to any disclaimer, the term of this patent is extended or adjusted under 35 U.S.C. 154(b) by 218 days.

(21) Appl. No.: 16/753,276

(22) PCT Filed: Oct. 3, 2018

(86) PCT No.: PCT/BR2018/050363
§ 371 (c)(1),
(2) Date: Apr. 2, 2020

(87) PCT Pub. No.: WO2019/068160
PCT Pub. Date: Apr. 11, 2019

(65) Prior Publication Data
US 2021/0069729 A1 Mar. 11, 2021

(30) Foreign Application Priority Data

Oct. 6, 2017 (BR) .......................... 102017021494-0
Oct. 1, 2018 (BR) .......................... 132018070227-0

(51) Int. Cl.
*B03D 1/01* (2006.01)
*B03C 1/00* (2006.01)
*B03C 1/30* (2006.01)
*B03D 1/008* (2006.01)

(52) U.S. Cl.
CPC ................ *B03D 1/01* (2013.01); *B03C 1/002* (2013.01); *B03C 1/30* (2013.01); *B03D 1/008* (2013.01); *B03C 2201/18* (2013.01); *B03C 2201/20* (2013.01); *B03D 2201/02* (2013.01)

(58) Field of Classification Search
CPC combination set(s) only.
See application file for complete search history.

(56) References Cited

U.S. PATENT DOCUMENTS 3,292,780 A 12/1966 Frommer
3,960,715 A 6/1976 Dicks et al.
(Continued)

OTHER PUBLICATIONS

International Search Report issued for corresponding International application No. PCT/BR2018/050363 dated Jan. 23, 2019.
(Continued)

*Primary Examiner* — Patrick H Mackey
(74) *Attorney, Agent, or Firm* — ArentFox Schiff LLP

(57) ABSTRACT

The present application relates to a concentration process of iron minerals from ultrafine tailings (slimes) from iron ore processing through reverse flotation with pH between 8.5 and 10.5 with the addition of amide-amine type collector, or further a mixture thereof with traditional cationic collectors (amines), in the absence of any depressant, alternatively including a step of high field magnetic concentration, which allows to obtain a concentrate with iron content higher than 66% and contents of SiO2+Al2O3 below 4%.

26 Claims, 7 Drawing Sheets

(56) References Cited

U.S. PATENT DOCUMENTS

| | | | | |
|---|---|---|---|---|
| 4,132,635 A | * | 1/1979 | Yang | B03D 1/002 209/166 |
| 4,301,973 A | * | 11/1981 | Lai | B03D 1/008 209/166 |
| 4,808,301 A | | 2/1989 | Hansen et al. | |
| 9,457,357 B2 | * | 10/2016 | Martins | B03D 1/01 |
| 9,511,378 B2 | * | 12/2016 | Hines | B03D 1/021 |
| 2014/0048454 A1 | | 2/2014 | Birken et al. | |
| 2017/0120258 A1 | * | 5/2017 | Silva | C01G 49/02 |

OTHER PUBLICATIONS

Samuel Thella et al. "Recovering iron values from iron ore slimes using cationic and anionic collectors" Proceedings of the XI International Seminar on Mineral Processing Technology (MPT-2010) Editors: R. Singh, A. Das, P.K. Banerjee, K.K. Bhattacharyya and N.G. Goswami © NML Jamshedpur, pp. 247-254.

Helder Silva Souza et all "Concentration of manganese tailings via reverse flotation in an acid medium", Rem Revista Escola de Minas, Ouro Preto, 69(1), c. 85-90.

Camila Peres Massola et al., Reverse Froth Flotation of Bauxites From the Zona Da Mata Area, XXII ENTMME I VII MSHMT—Ouro Preto-MG, Nov. 2007, pp. 431-437.

Yang Yuxin et al., "Current research status on cationic collectors of reverse flotation desilication," Light Metals, Issue No. 6, 2008 (published on Jun. 20, 2008).

Marcos Gomes Vieira, Production of a pellet feed from the concentration of mechanical flotation tailings from Samarco, UFMG School of Engineering, 2008, 90 pages.

Rodrigues, O. M. S. Flotation of kaolinite in iron and bauxite ores. 2012. 170 f. Thesis (Doctorate in Metallurgical Engineering)—School of Engineering, Federal University of Minas Gerais, Belo Horizonte, (2012).

A. G. Tolkushev "Improving the complexity of the use of raw materials in the processing of ore of a complex material composition of the Mikhailovsky deposit", Bulletin of the Kursk State Technical University, N1 (26), 2009, Kursk, p. 30-33.

* cited by examiner

CONCENTRATION PROCESS OF IRON ORE SLIMES

CROSS-REFERENCE TO RELATED APPLICATION

This application is a 371 National Stage of PCT/BR2018/050363 filed Oct. 3, 2018, which claims priority to Brazilian Application No. 132018070227.0 filed Oct. 1, 2018 and Brazilian Application No. 102017021494.0 filed Oct. 6, 2017.

The present application is directed primarily to the mining industry and comprises a concentration process of iron minerals contained in iron ore ultrafine tailings (slimes) through reverse cationic flotation with the addition of amide-amine type collectors or further, optionally, combinations thereof with conventional organic based branched chain cationic type collectors (amine), without depressant addition; said process including, alternatively, a step of high intensity magnetic concentration for the production of a product with high iron content, low contaminants content and high specific surface area.

BACKGROUND

Flotation is the main concentration process of iron ore mining industry. Traditional processes require ultrafines removal before flotation, because of the impact on the efficiency of the concentration process. Currently, in most concentrators, ultrafines are removed by desliming, followed by thickening. The tailings (slimes) from this process (thickener overflow) are directed to conventional tailings dams, which generates a series of impacts.

Currently, the mining industry produces hundreds of millions of tons of waste and tailings per year. In the case of tailings, significant part of this material is disposed in dams, with high impact in the overall costs, due to construction, operation and management costs, as well facing serious environmental hazards, and danger of environmental disasters, such as disruptions. Such risks represent an important socio-environmental concern, as they imply on difficulties to obtain environmental licensing.

Despite government's efforts, legislation and available technologies, disruption of mining tailings dams still accounts for accidents, sometimes catastrophic, with serious economic, social and environmental consequences. Dam failures can dump millions of cubic meters of tailings into the environment, displacing entire communities, contaminating drinking water supplies, such as rivers and lakes, and devastating local wildlife, human and animal livelihoods in the affected region.

Considering this scenario, the mining sector has made great investments in order to develop processes that minimize the impacts produced by its activity in general and, in particular, by the mining tailings and waste. The development of processes able to mitigate the problems from iron ore processing plays a major role in the mining industry.

One of the alternatives that minimizes the impact of iron ore industry tailings generation is the development of a process able to reduce the amount of ultrafines disposed in dams, through the exploitation of iron ore tailings.

The slimes from iron ore concentration operations in the Quadrilátero Ferrífero area (Minas Gerais State), has iron contents ranging from 40% to 50%. These slimes are characterized by the high content of ultrafine particles, with approximately 30% solids by weight, being disposed in dams.

Some processes have been used to recover iron minerals from the tailings, thus, reducing the amount of tailing sand their environmental impact. Reverse flotation at pH about 10.5, using depressant and cationic collector can be mentioned as one option.

In this traditionally known process, a cationic collector is added to the pulp, which consists of a petroleum-derived organic branched-chain ether-amine class reagent, having as purpose to change the surface of quartz particles from hydrophilic to hydrophobic so that they can be dragged to the surface by the bubbles introduced into the process. This type of cationic collector normally requires a short conditioning time, approximately 1 minute, to act on the minerals to be floated.

Since this type of cationic collector does not act selectively, it requires the use of a depressant, usually a polysaccharide, such as starch. In iron ore flotation, starch is employed to render the surface of iron bearing minerals hydrophilic to improve the flotation selectivity of other silicate minerals, inhibiting the action of the collector on them and directing the iron minerals to the sunk.

The use of this conventional method to recover iron-bearing minerals from the tailings presents problems of low metallurgical recoveries and high contaminant content in the final product.

One of the major challenges for the recovery of iron minerals from tailings is an efficient separation of quartz, kaolinite and other gangue minerals from iron ore minerals. Kaolinite, a gangue constituent in the finer fractions of the ore, is the main inhibitor of the traditional reverse flotation process due to its morphological characteristics and surface load.

In the state of the art, there are separation processes of gangue with kaolinite from minerals of interest, such as that described in Souza et al. (SOUZA, H. S.; TESTA, F. G.; BRAGA, A. S.; KWITKO-RIBEIRO, R.; OLIVEIRA, A. H.; LEAL FILHO, L. S. Desenvolvimento de uma rota de flotação como alternativa para concentração de minérios de manganês de baixo teor. In: ENCONTRO NACIONAL DE TRATAMENTO DE MINÉRIOS E METALURGIA EXTRATIVA, 26, 2015, Poços de Caldas). In this case, the process consists of concentrating manganese from the fines produced in the beneficiation of this ore, where kaolinite is the main gangue mineral. The process performs reverse cationic flotation using an amide-amine type collector selective for kaolinite, and modified starch as a depressant for manganese oxide depression. Unlike the process used in the present application, the manganese ore undergoes a desliming step prior to flotation, which means that the ultrafine fraction (<10 µm) is removed from the process. The obtained results showed that the process did not have the desired efficiency, since manganese content in the concentrate was only 34% by weight.

Rodrigues (RODRIGUES, O. M. S. Flotação de caulinita em minérios de ferro e bauxíticos, 2012. 170. Thesis (Doctorate in Metallurgical Engineering—Escola de Engenharia, Universidade Federal de Minas Gerais, Belo Horizonte, 2012) describes a study about the efficiency of several cationic collectors and depressants used to separate kaolinite from bauxite ore, as well from iron ore by reverse flotation. The study analyzed the efficiency of eight distinct collectors such as amines, amine salts and DTAB (dodecyltrimethylammonium bromide). Some of the collectors studied, CTAB, Flotigam 2835® and DTAB, showed good selectivity in certain pH ranges and in the presence or absence of certain depressants. However, no satisfactory iron recovery was achieved in either case.

A similar situation is described in the technical paper by Rodrigues et al. (RODRIGUES, O. M. S., ROCHA, D. C., PERES, A. E. C., PEREIRA, C. A., CURI, A. Seletividade na separação entre caulinita e hematita por flotação. In: ENCONTRO NACIONAL DE TRATAMENTO DE MINÉRIOS DE METALURGIA EXTRATIVA. 24, 2011, Salvador, p. 360 to 366), where the successful use of a reverse cationic flotation process using an amine as a collector and starch as haematite depressant is reported.

The document of Bittencourt et al. (BITTENCOURT, L. R. M., MILLER, J. D., LIN, C. L.) The flotation recovery of high-purity gibbsite concentrates from a Brazilian bauxite ore In: Adv Mater Appl Miner Metall Process Princi, 1990, Littleton, USA: Publ By Soc of Mining Engineering of AIME, 1990, p. 77 to 85) presents a study on the concentration of gibbsite for refractories production from bauxite ore containing 50% gibbsite, 35% quartz and 15% kaolinite. In the process described, gibbsite is concentrated in two steps: first, gibbsite and kaolinite are separated from quartz by direct flotation at pH 2; then, kaolinite is separated by reverse cationic flotation with a quaternary ammonium salt used as a collector at pH 6.

All processes described above require, in addition to the cationic collector, the use of a depressant to succeed in recovering the desired mineral. In addition, the achievement of efficient separation of quartz and kaolinite in iron ore slimes is still an obstacle to the use of tailings from its processing. The present application aims to overcome the described problems.

The concentration of iron ore slimes by column flotation using ether-amine and corn starch was studied by Rocha (ROCHA, L. Estudo de aproveitamento econômico das lamas de uma mineração de ferro, através de concentrção catiônica reversa. Master Thesis, Escola de Engenharia, Universiade Federal de Minas Gerais, Belo Horizonte, 2008), where the achievement of a concentrate with 67% Fe and $SiO_2$ of less than 1%, and an overall mass recovery near to 20%, with previous use of microdesliming to remove ultrafine particles smaller than 5 μm present in the tailings was described.

The developed process, object of the present patent application, is inserted in this context and provides a solution to reduce the volume of material discharged during the iron ore processing by recovering the iron minerals contained in these residues.

SUMMARY

An aspect of the present application may reduce the volume of tailings from iron ore processing which is currently disposed of in dams.

Another aspect of the present application may increase the use of ultrafines (slimes) from iron ore processing through a process of concentration of the iron minerals present in the tailings.

It is a further object of the present application to provide a process which obtains efficient separation of kaolinite and quartz from iron minerals in a simpler and economical way, with the obtainment of a product with high iron content, low contaminant content and high specific surface.

The present application discloses a concentration process of iron minerals from slimes, without prior removal of ultrafine particles (<5 μm) from the iron ore processing. While traditional processes are conducted after removal of ultrafine particles (<5 μm), at high pH, of the order of 10.5, the present process is characterized by containing a reverse flotation step with pH between 8.5 and 10.5 with addition of amide-amine collector, or a mixture thereof with traditional cationic collectors (amine). Unlike the traditional processes, the proposed process is carried out in the absence of any depressant and has the purpose of solving the problem of separating the iron ore from kaolinite and quartz, obtaining also a high recovery of iron and, consequently, a better use of the residues. Further, the flotation process of this application may be associated with a wet high intensity magnetic concentration process with a field of 13,000 to 18,000 Gauss and a gap matrix of 1.1 to 1.5 mm.

BRIEF DESCRIPTION OF THE DRAWINGS

The present application is described in detail based on the respective figures.

DETAILED DESCRIPTION

Figure 1:
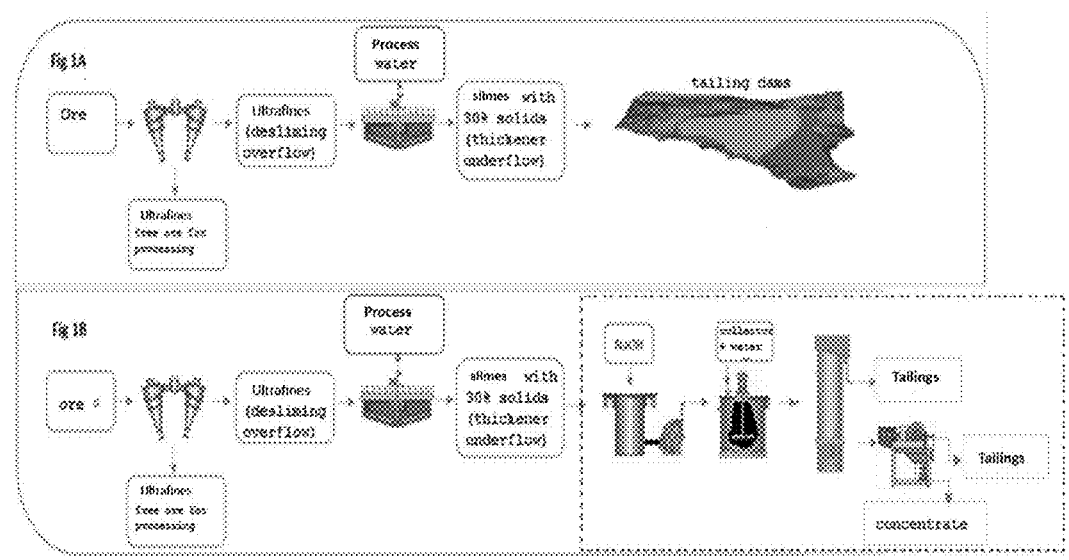
FIG. 1 shows a flowsheet comparing the state of the art and the slimes concentration route of the present application.

Although the present application may be susceptible to different embodiments, preferred embodiments are shown in the drawings and in the following detailed discussion with the understanding that the present description should be considered an exemplification of the principles of the application and is not intended to limit the present application to what has been illustrated and described herein.

Unless otherwise noted, all parts and percentages are by weight.

The main approach of the present application relates to a process of concentration of iron ore from slimes generated in the processing of iron ore comprising the following steps:
a) adjusting slimes pH to a value in the range of 8.5 to 10.5 by adding a base;
b) adding amide-amine cationic collector, or a mixture of said collector with one or more other collectors, to the slimes and performing the conditioning of said collector;
c) adjusting the pulp percent solids by addition of water; and
d) performing reverse flotation, in the absence of depressant, to obtain an iron rich concentrate.

The most used iron ore beneficiation process in the mining industry consists of flotation. The use of this process requires previous steps of desliming, which is the removal of the ultra-fine particles, which impairs the efficiency of the concentration process.

The desliming of this ore is generally carried out by means of hydrocyclones. As shown in FIG. 1, the overflow from desliming, composed of ultrafine particles, is led to a subsequent process known as thickening. In this operation of slimes thickening, recovered process water and a thick product with 30% solids, the thickener underflow, are obtained. In the state of the art, the destination of these thickened slimes, or thickened ultrafines, are the tailings dams, as represented by FIG. 1A.

The present application uses said slimes as a starting material, carries out a concentration process as shown in FIG. 1B, and obtains a concentrate containing more than 60% of iron content.

The iron ore slimes of the present application are preferably derived from iron ore concentration operations in the Quadrilátero Ferrífero Area, of Minas Gerais State, and are basically composed of gangue minerals, mainly quartz and kaolinite, and iron minerals. Slimes iron content ranges from 40% to 50%.

Preferably, the slimes used in the process of the application are approximately 30% solids and are composed of ultrafine ore particles. The typical size distribution of iron ore slimes can be visualized by means of FIG. 2. Typically, the slimes have about 50% particles below 10 μm and 20% below 3 μm, in addition to maximum particle size (top size) near to 45 μm.

Figure 3:
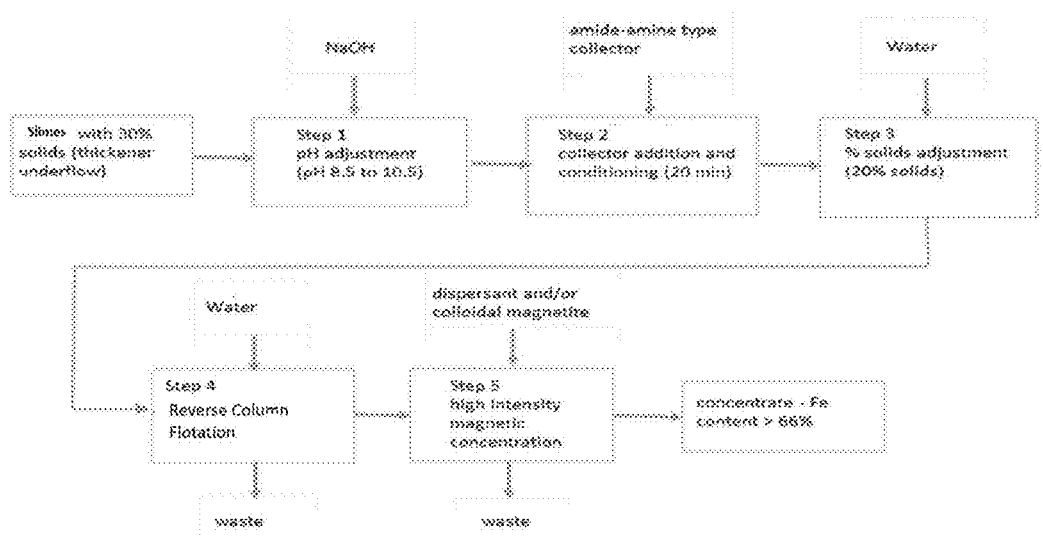
FIG. 3 shows a flowsheet detailing the steps of the iron ore slimes concentration process of the present application.

As shown by the flowsheet of FIG. 3, the first step of the process of the present application consists of adjusting the pH of the slimes by adding a base, preferably sodium hydroxide (NaOH), until achieving a pH between 8.5 and 10.5, the preferred pH range of the present application.

The second step of the process consists of adding collectors and conditioning thereof. The collectors used in the present application are straight-chain amide-amine type formulated from vegetable fatty acids and are selective for the extraction of quartz and kaolinite. Preferably, the present application uses a commercially available collector called Flotinor-5530®, produced by the company Clariant®. The collector can be used alone, or in combination with traditional cationic organic branched-chain collectors, in different ratios.

The collectors are preferably added in an amount ranging from 50 to 1000 g/t (grams of collector per ton of slimes). This value varies according to the surface area of the slimes and contaminants content (quartz and kaolinite).

Preferably, the conditioning of the collectors is carried out in stirred tank, with residence time varying from 10 to 30 minutes, preferably 20 minutes, in order to promote and guarantee the adsorption of the collectors to the particles of quartz and kaolinite. The need for longer conditioning time compared to the conventional process, which takes about 1 minute, is explained by the high surface area of the iron ore slimes, which requires more time for the interaction between the mineral particles and the collecting reagents.

Preferably, the process of the present application occurs without the addition of any type of depressant. It is observed that the depressants act in the depression of iron, as well kaolinite. Therefore, the addition of depressant would be detrimental to the process since it reduces the selectivity for the removal of this gangue mineral (kaolinite) present in iron ore slimes.

The third step of the process of the present application is adding water to the process at the stirred tank output to ensure that the pulp has approximately 20% solids, a condition suitable for the next step (reverse flotation).

The fourth step of the process of the present application is reverse column flotation, a method known in the state of the art. In this step, air, or any other suitable gas, is bubbled into the system, and the bubbles drags the particles of quartz and kaolinite to the surface.

The reverse flotation step preferably occurs in an open circuit, which can be carried out in one stage or in more than one stage, with a cleaner stage. The cleaner stage is a flotation step which uses a relatively poor concentrate, from a previous flotation step, and produces a concentrate and tailings with higher grade.

In the conventional column flotation process, the pulp residence time is approximately 20 min. In the present application a longer time (20 to 60 min, preferably 40 min) is used because slimes size characteristics: the thinner the particles, the longer the time required for sedimentation. In addition, the longer residence time is necessary in order to reach the appropriate overflow speed, reducing the hydrodynamic drag of iron particles together with the gangue. The overflow rate comprises the ratio of the float material rate which exits the top of the column (ton/h), by the cross-sectional area of the column (m$^2$). The overflow rate in the conventional flotation is about 5 ton/h/m$^2$. In the present application, the overflow rate is not more than 2 ton/h/m$^2$.

The use of washing water, added at the top of the column, promotes the washing of the foam and drives the iron minerals to the sunk, thereby increasing the separation efficiency. Therefore, washing water is necessary to reduce the hydrodynamic drag of iron minerals and direct them to the sunk.

Washing water also promotes pulp dilution. In the present application the pulp should contain about 15 to 20% solids, preferably 15%. In the conventional flotation process, solids percent is about 40 to 50%. The granulometric characteristics of the slimes require a greater dilution in the flotation medium, for greater efficiency of contact of the gangue particles with the air bubbles, and less entrapment and dragging of iron particles by the foam (hydrodynamic drag). Therefore, the amount of water used should be such as to promote the dilution of the pulp to the range of 15 to 20% solids.

Following the reverse flotation step, an iron concentrate is obtained. The present application allows the recovery of more than 90% of the iron present in the slimes and to obtain concentrates with iron contents above 60% with low impurities content, enabling a possible commercialization of this new product that was previously discharged as tailings.

As described above, the process of application takes place at a pH range different from that conventionally used. The process proposes the use of collectors other than those traditionally used hitherto, with conditioning time much longer than the time adopted in conventional reverse flotation technology and even longer flotation time, higher dilution of the pulp during flotation, in addition to the absence of any depressant.

In an alternative embodiment of the present application, after the reverse column flotation step, the obtained concentrate is sent to a high intensity magnetic concentration step, aiming at the removal of contaminants, mainly quartz and kaolinite not been removed by flotation. In this step, a magnetic field of 13,000 to 18,000 Gauss is applied, gap matrix of 1.1 to 1.5 mm, solids percent in the feed can vary from 15% to 35%, and washing water from 3 to 5 times the feed rate. Magnetic concentration equipment can be used with matrices arranged horizontally or vertically, the latter being combined with pulsation of the pulp in the basin.

Optionally, chemical reagents can be used in the magnetic concentration step, aiming at greater selectivity in the separation between iron minerals and gangue minerals, mainly quartz and kaolinite. The chemical reagents are dispersants, selected from the group consisting of sodium hexametaphosphate and sodium silicate, and also the reagent called colloidal magnetite. Colloidal magnetite increases the magnetic susceptibility of iron minerals, while the dispersants promote the greater dispersion between the iron minerals and the gangue minerals, promoting a greater separation between them.

Said chemical reagents are added to the process in a stirred conditioning tank, with residence time varying from 2 to 5 minutes, following to the magnetic concentration step.

The dosages of the reagents applied during the magnetic concentration step are 200 to 400 g/t for the dispersants and 300 to 700 g/t for the colloidal magnetite.

The combination of flotation steps and magnetic concentration promotes the removal of quartz higher than 95% and kaolinite higher than 85%, allowing the final concentrate to be obtained with an iron content higher than 66% and $SiO_2+Al_2O_3$ lower than 4, 0%, in addition to a global recovery of more than 45% and metallic recovery of more than 70%.

Thus, although only some embodiments of the application have been shown, it will be understood that various omissions, substitutions and alterations may be made by a person skilled in the art without departing from the spirit and scope of the present application. The embodiments described should be considered in all aspects only as illustrative and not restrictive.

It is expressly provided that all combinations of the elements performing the same function in substantially the same manner to achieve the same results are within the scope of the application. Substitutions of elements from one described embodiment to another are also fully intended and contemplated. It is also necessary to understand that the drawings are not necessarily in scale, but that they are only of a conceptual nature. The intention is, therefore, to be limited, as indicated by the scope of the appended claims.

The following examples are offered in the sense of aiding the understanding of the present application and should not be considered as limiting its scope.

EXAMPLE 1

Iron minerals concentration tests were performed using slimes's samples from iron ore processing. These slimes samples were from iron ore operations located in the Quadrilátero Ferrífero Area (state of Minas Gerais, Brazil) and had chemical, mineralogical and size distribution typical of this region.

Table 1 shows chemical composition of the sample having the content of about 45% Fe, 28% $SiO_2$ and 3% $Al_2O_3$. It is important to remember that kaolinite is the main $Al_2O_3$ bearing mineral.

TABLE 1

Chemical composition of iron ore slimes

| Fe (%) | $SiO_2$ (%) | P (%) | $Al_2O_3$ (%) | Mn (%) | $TiO_2$ (%) | CaO (%) | MgO (%) | IL (%) Ignition Loss |
|---|---|---|---|---|---|---|---|---|
| 45.19 | 28.69 | 0.076 | 3.11 | 0.103 | 0.116 | 0.019 | 0.019 | 2.87 |

Figure 2:
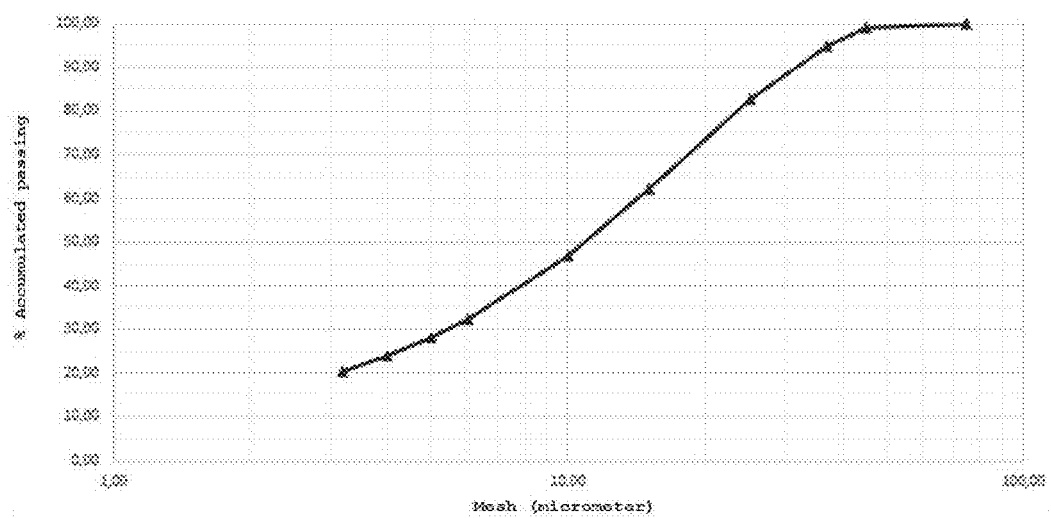
FIG. 2 shows the typical size distribution of iron ore slimes.

Regarding the size distribution, the slimes sample had about 50% particles below 10 μm and a maximum particle size (top size) near to 45 μm, as shown in the graphic of FIG. 2.

Figure 4:
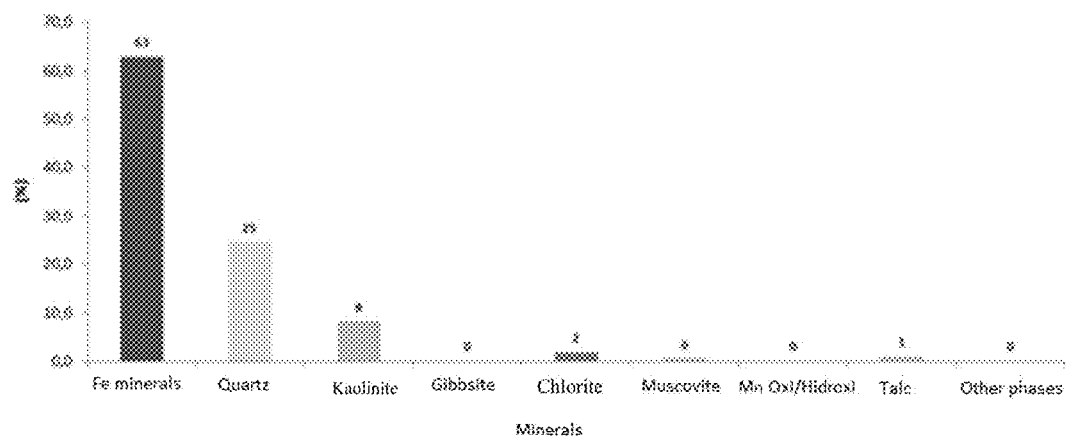
FIG. 4 illustrates the typical mineralogical composition of iron ore slimes.

Regarding the mineralogical composition, the samples had about 63% of iron minerals (mainly haematite and goethite), 25% of quartz and 8% of kaolinite, as shown in the graphic of FIG. 4.

The pH adjustment of the slimes, which had 30% solids, was performed in stirred tank with the addition of sodium hydroxide (NaOH) until pH 10.5 was reached.

152 g/t of Flotinor-5530® collector, produced by the company Clariant®, was used and the conditioning time was 20 minutes. Water was added to the process in the stirred tank pipe output such that the slimes reached 20% solids.

Slimes samples were subjected to flotation tests on a single stage, 6-meter-high, 8-inch-diameter column with feed rate of 80 kg/h. The residence time in the column was approximately 30 minutes and pulp solids percent remained in the range of 20 to 15%. No depressant was added.

The final concentrate successfully achieved high iron content and low quartz and kaolinite contents. The results presented in Table 2 show the results obtained, with a concentrate containing 62.81% Fe and only 3.21% $SiO_2$ (quartz). A substantial portion of quartz was removed for the flotation tailings, and also a certain amount of kaolinite. In addition, the metallurgical recovery of iron was quite high: 93.83%.

TABLE 2

Results from the iron ore slimes concentration route

| Flow | Mass (%) | Fe Rec. (%) | Fe (%) | $SiO_2$ (%) | P (%) | $Al_2O_3$ (%) | Mn (%) | IL Ignition Loss (%) |
|---|---|---|---|---|---|---|---|---|
| Feed | 100.00 | 100.00 | 44.52 | 29.44 | 0.077 | 3.04 | 0.075 | 2.60 |
| Concentrate | 66.51 | 93.83 | 62.81 | 3.21 | 0.104 | 2.50 | 0.109 | 3.12 |
| Tailings | 33.49 | 6.17 | 8.20 | 81.54 | 0.024 | 4.12 | 0.007 | 1.57 |

EXAMPLE 2

The same slimes samples used in the previous example were tested with different process parameters, as reported in Table 3:

Type of collector: traditional (ether-amine) or Flotinor-5530® (amide-amine)

Collector dosage: 50 to 500 g/t

Use of depressant: with or without starch pH: 8.5 to 10.5

Slimes samples were subjected to flotation tests on a single stage, 6-meter-high, 8-inch-diameter column with a feed rate of 80 kg/h.

The results presented in Table 3 show that using traditional ether-amine collectors, the best metallurgical result of iron recovery is about 93%, however, a high impurity concentrate ($SiO_2$>10%) is obtained. And, in order to obtain a low silica content in the concentrate (3.73%), a high amount of iron is drawn into the float (hydrodynamic drag), which can be proven with the low metallurgical recovery of iron (about 67%).

Tests using at least 100 g/t of Flotinor-5530®, an amide-amine type collector, at high pH, showed good results. The best result was the test using 152 g/t Flotinor-5530®, at pH 10.5, obtaining a concentrate with 63% iron, 3% silica and 94% of metallurgical recovery.

The use of depressant (starch) impaired results even using Flotinor-5530® as a collector. The results showed a reduction of the metallurgical recovery to about 64%, because it reduces the selectivity of the process.

EXAMPLE 3

Magnetic concentration tests were performed with the concentrate from the pilot scale flotation, with a feed rate ranging from 80 kg/h to 200 kg/h. Equipment with horizontally disposed matrix without pulsation of pulp and equipment with vertically disposed matrix with pulsation of the pulp in the basin were tested, both with percent solids ranging from 15 to 35%, magnetic field of 13,000 to 18,000 Gauss and gap matrix, from 1.1 to 1.5 mm. The tests were performed with and without addition of chemical reagents. The results obtained are shown in Table 4 below.

TABLE 4

Process parameters and results obtained in magnetic concentration tests

| Matrix | Field (Gauss) | Gap (mm) | Dispersant (g/t) | Colloidal Magnetite (g/t) | Met. Rec. (%) | Conc. % Fe | Conc. % SiO$_2$ + % Al$_2$O$_3$ |
|---|---|---|---|---|---|---|---|
| Vertical | 13,000 | 1.5 | 0 | 0 | 74.86 | 67.33 | 3.08 |
| Vertical | 13,000 | 1.5 | 0 | 0 | 73.18 | 67.69 | 2.10 |
| Vertical | 13,000 | 1.5 | 0 | 0 | 73.10 | 66.35 | 3.46 |
| Vertical | 13,000 | 1.5 | 0 | 0 | 49.42 | 57.43 | 11.75 |
| Vertical | 13,000 | 1.5 | 300 | 0 | 69.34 | 63.63 | 4.17 |
| Vertical | 13,000 | 1.5 | 0 | 0 | 64.54 | 64.42 | 6.38 |
| Vertical | 13,000 | 1.5 | 0 | 500 | 69.84 | 64.71 | 5.32 |
| Horizontal | 13,000 | 1.1 | 0 | 0 | 70.50 | 65.23 | 5.83 |
| Horizontal | 18,000 | 1.1 | 0 | 0 | 66.30 | 66.40 | 4.09 |

The results of Table 4 show that the application of the high field magnetic concentration, after the flotation step, allows the obtainment of concentrate with iron content above 67%. The addition of 300 g/t of sodium hexametaphosphate as a dispersant allows increasing the iron content in the concentrate from 57.43% to 63.63% and reduce SiO$_2$+Al$_2$O$_3$ contents from 11.75% to 4.17%. The addition of 500 g/t of colloidal magnetite promoted an increase in metallic recovery from 64.54% to 69.84% and reduction in SiO$_2$+Al$_2$O$_3$ contents from 6.38% to 5.32%.

The tests presented in Table 4 also prove that the increase of the magnetic field from 13,000 Gauss to 18,000 Gauss promotes an increase in the iron content from 65.23% to 66.40% and reduction in SiO$_2$+Al$_2$O$_3$ content from 5,83% to 4.09%.

TABLE 3

Process parameters and results obtained in each test

| Collector | (g/t) | Starch (g/t) | pH | Metallic Rec. (%) | Concentrate % Fe | Concentrate % SiO$_2$ |
|---|---|---|---|---|---|---|
| Traditional | 105 | 0 | 8.5 | 89.23 | 57.71 | 10.70 |
| Traditional | 113 | 0 | 9.5 | 67.59 | 64.01 | 3.73 |
| Traditional | 115 | 0 | 10.5 | 34.91 | 55.67 | 6.48 |
| Traditional | 112 | 552 | 8.5 | 92.58 | 57.66 | 10.31 |
| Traditional | 101 | 497 | 9.5 | 70.12 | 59.28 | 5.85 |
| Flotinor 5530 ® | 199 | 0 | 8.5 | 88.11 | 61.63 | 4.55 |
| Flotinor 5530 ® | 49 | 0 | 8.5 | 96.63 | 58.43 | 7.96 |
| Flotinor 5530 ® | 51 | 0 | 9.5 | 96.87 | 58.98 | 7.35 |
| Flotinor 5530 ® | 47 | 0 | 10.5 | 95.67 | 53.72 | 15.3 |
| Flotinor 5530 ® | 127 | 0 | 10.5 | 95.85 | 63.68 | 4.66 |
| Flotinor 5530 ® | 108 | 0 | 9.5 | 86.18 | 61.37 | 4.18 |
| Flotinor 5530 ® | 101 | 0 | 8.5 | 91.24 | 61.04 | 4.74 |
| Flotinor 5530 ® | 152 | 0 | 8.5 | 87.03 | 61.94 | 4.1 |
| Flotinor 5530 ® | 149 | 0 | 9.5 | 79.04 | 62.00 | 3.64 |
| Flotinor 5530 ® | 152 | 0 | 10.5 | 93.83 | 62.81 | 3.21 |
| Flotinor 5530 ® | 184 | 0 | 10.5 | 93.23 | 62.32 | 3.34 |
| Flotinor 5530 ® | 472 | 263 | 8.5 | 63.73 | 59.56 | 4.86 |
| Flotinor 5530 ® | 508 | 563 | 8.64 | 64.52 | 60.65 | 4.60 |

EXAMPLE 4

Figure 5:
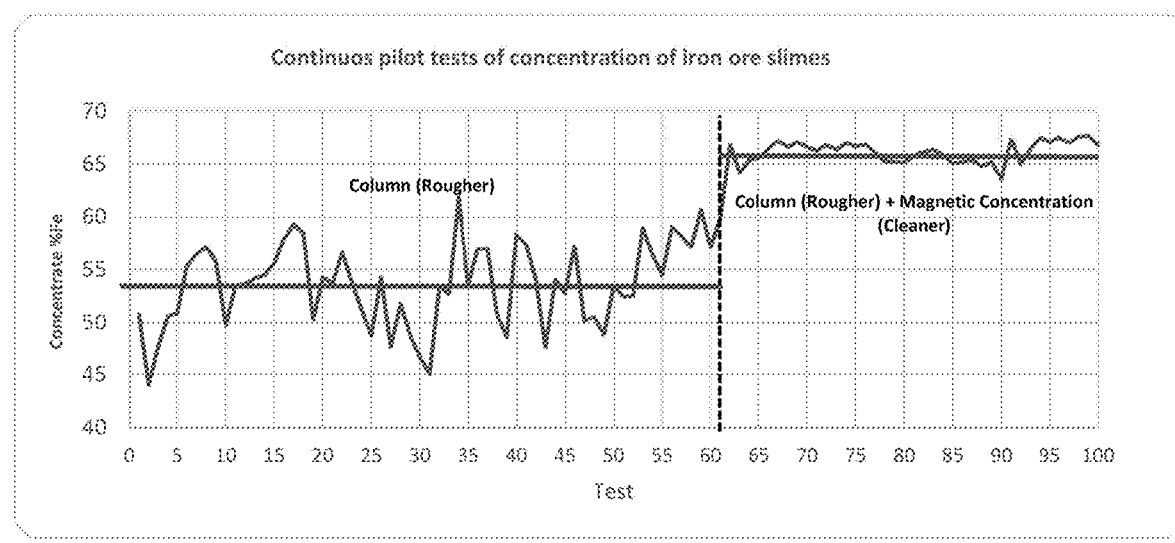
FIG. 5 shows the iron (Fe) content in the concentrates obtained in the continuous column flotation pilot tests+magnetic concentration.
Figure 6:
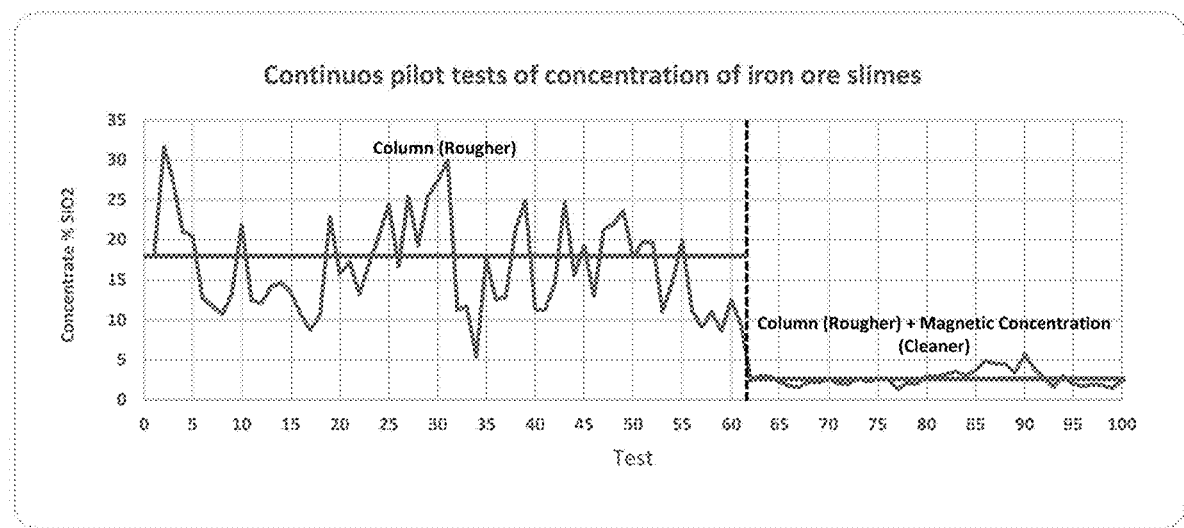
FIG. 6 shows the silica ($SiO_2$) content in the concentrates obtained in the continuous column flotation pilot tests+magnetic concentration.
Figure 7:
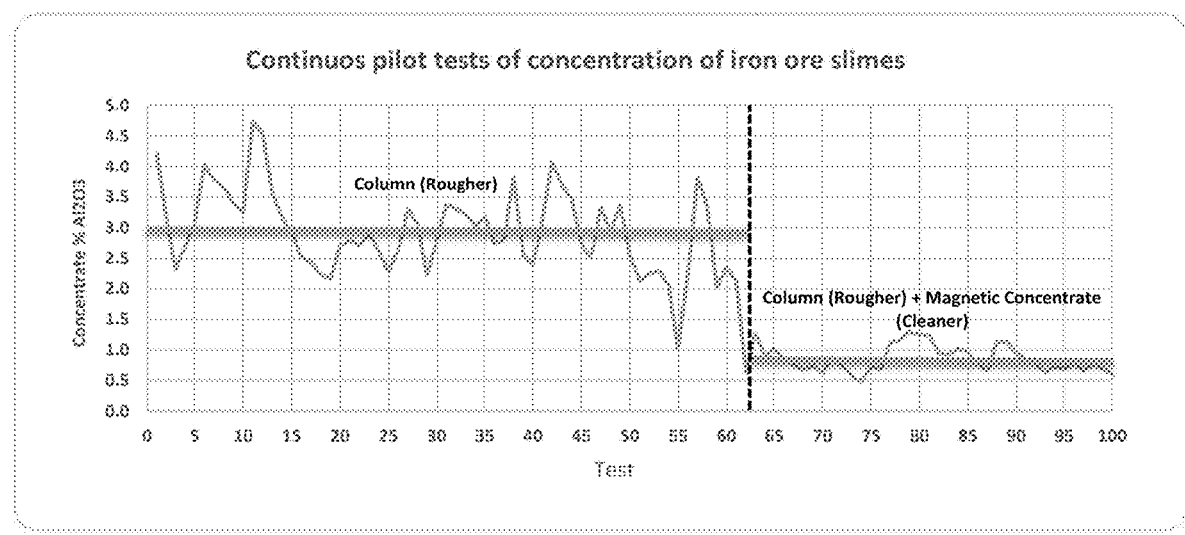
FIG. 7 shows the alumina ($Al_2O_3$) content in the concentrates obtained in the continuous column flotation pilot tests+magnetic concentration.

In addition, continuous pilot scale tests were carried out using a flotation column of 508 mm diameter and 4 meters height in the rougher stage and a magnetic concentration with a field of 13,000 Gauss, gap of 1.5 mm and a pulsating bed in Longi LGS-500EX 1.3 T equipment in cleaner step. The tests were carried out with a feed rate of 500 kg/h, 35% solids, 200 g/t Flotinor 5530 collector, pH 10.5, 700 liters/h wash water, magnetic field of 13,000 Gauss, gap of 1.5 mm and 300 rpm of basin pulsation. The results obtained are shown in Table 5 below and in FIGS. 5, 6 and 7.

TABLE 5

Results on pilot scale in flotation column + magnetic concentration
Circuit: Column (rougher) + magnetic concentration (cleaner)

| Flow | Mass Rec. (%) | Metallic Rec. (%) | Fe | $SiO_2$ | $Al_2O_3$ | Blaine ($cm^2/g$) |
|---|---|---|---|---|---|---|
| Feed | 100.00 | 100.00 | 44.79 | 30.87 | 2.70 | Xx |
| RG Concentrate | 78.15 | 92.69 | 53.13 | 17.40 | 2.98 | Xx |
| RG Tailings | 21.85 | 7.31 | 14.98 | 73.08 | 3.78 | Xx |
| CL Concentrate | 51.78 | 76.50 | 66.18 | 2.68 | 0.84 | 2,500 a 3,500 |
| CLTailings | 26.36 | 16.19 | 27.51 | 63.18 | 7.17 | XX |

The results show that column flotation followed by magnetic concentration allows obtaining concentrate with iron content higher than 66% and $SiO_2+Al_2O_3$ contents below 4%. In addition, this route allows obtaining iron concentrate with a specific surface (blaine) of more than 2,500 $cm^2/g$, which allows the use of this concentrate as a feedstock (pellet feed) for the pelletizing process, and may also promote energy consumption reduction in the grinding step to obtain feed with a mean surface of 1,500 $cm^2/g$.

The invention claimed is:

1. A process of concentrating iron minerals from ultrafine tailings (slimes) from processing iron ore comprising:
   a) adjusting a pH of the slimes to a value in the range of 8.5 to 10.5 by adding a base;
   b) adding a collector, wherein the collector comprises an amidoamine cationic collector or a mixture of said amidoamine cationic collector with one or more other collectors, to the slimes and performing conditioning of said collector;
   c) adjusting a pulp percent solids by addition of water;
   d) performing reverse flotation, in the absence of depressant, to obtain an iron rich concentrate; and
   e) a high field wet magnetic concentration step.

2. The process according to claim 1, wherein the slimes comprise ultrafine particles comprising iron minerals and gangue minerals.

3. The process according to claim 2, wherein the iron minerals comprise hematite and goethite, and an iron content is 40 to 50%.

4. The process according to claim 2, wherein the ultrafine particles comprise quartz and kaolinite.

5. The process according to claim 1, wherein the slimes have 20 to 40% solids.

6. The process according to claim 1, wherein the base added in step (a) is sodium hydroxide (NaOH).

7. The process according to claim 1, wherein the amidoamine cationic collector is a straight-chain collector formulated from fatty acids of vegetable origin.

8. The process according to claim 7, wherein the amidoamine cationic collector comprises N-[3-(Dimethylamino)propyl]dodecanamide as an active molecule.

9. The process according to claim 1, wherein the one or more other collectors comprise an ether-amine class organic branched-chain cationic collector.

10. The process according to claim 1, wherein the collector is added in an amount in the range of 50 to 1000 g/t (grams of collector per ton of slimes).

11. The process according to claim 1, wherein a conditioning time of the collector in step (b) ranges from 10 to 30 minutes.

12. The process according to claim 11, wherein the conditioning time of the collector in step (b) is 20 minutes.

13. The process according to claim 1, wherein in step (c) adjusting the pulp percent solids is carried out so that the pulp percent solids is in the range of 15 to 25% solids.

14. The process according to claim 13, wherein the pulp percent solids is 20% solids.

15. The process according to claim 1, wherein in step (d), reverse flotation occurs in columns, with addition of water for washing a foam and directing iron minerals to a sunk.

16. The process according to claim 15, wherein the water is added in an amount which promotes dilution of pulp to a range of 15 to 20% solids.

17. The process according to claim 1, wherein a residence time of pulp in a column flotation in step (d) is from 20 to 60 minutes.

18. The process according to claim 17, wherein the residence time is 40 minutes.

19. The process according to claim 1, wherein a float overflow rate in step (d) is not more than 2 ton/h/m².

20. The process according to claim 1, wherein the reverse flotation, in step (d), occurs in an open circuit and in one stage.

21. The process according to claim 1, wherein the reverse flotation, in step (d), occurs in open circuit in more than one stage with a cleaner stage.

22. The process according to claim 1, wherein in the high field wet magnetic concentration step, a field intensity is from 13,000 to 18,000 Gauss.

23. The process according to claim 1, wherein magnetic concentration equipment with horizontally or vertically disposed dies, with or without pulsing movement of pulp in a basin, is employed.

24. The process according to claim 1, wherein dispersing reagents selected from the group consisting of sodium hexametaphosphate and sodium silicate are employed.

25. The process according to claim 1, wherein colloidal magnetite is employed as a reagent.

26. The process according to claim 1, wherein an iron concentrate obtained has an iron content above 66% by weight and a $SiO_2+Al_2O_3$ content below 4.0% by weight.

* * * * *